United States Patent [19]
Tomita

[11] Patent Number: 4,549,226
[45] Date of Patent: Oct. 22, 1985

[54] ELIMINATING THE LOW-FREQUENCY CHROMINANCE SIGNAL FOR TRACKING IN A VIDEO TAPE RECORDER

[75] Inventor: Masao Tomita, Neyagawa, Japan

[73] Assignee: Matsushita Electric Industrial Co., Ltd., Kadoma, Japan

[21] Appl. No.: 433,532

[22] Filed: Oct. 8, 1982

[30] Foreign Application Priority Data

Oct. 9, 1981 [JP] Japan ................................ 56-161668

[51] Int. Cl.⁴ .................... G11B 21/10; H04N 5/92
[52] U.S. Cl. ................................ 358/328; 358/327; 358/320; 360/77
[58] Field of Search .............. 358/312, 327, 328, 320, 358/31; 360/77, DIG. 1, 10.2, 70

[56] References Cited

U.S. PATENT DOCUMENTS

| | | | |
|---|---|---|---|
| 4,141,047 | 2/1979 | Kambara et al. | 360/DIG. 1 |
| 4,151,570 | 4/1979 | Ravizza et al. | 360/77 |
| 4,172,265 | 10/1979 | Sakamoto et al. | 360/DIG. 1 |
| 4,344,082 | 8/1982 | Ishiodori | 358/328 |
| 4,402,006 | 8/1983 | Karlock | 358/31 |

FOREIGN PATENT DOCUMENTS 55-74285   4/1980   Japan ................................. 358/31
2047436A   1/1980   United Kingdom .

OTHER PUBLICATIONS

Shiraishi et al.; Video Cassette Recorder Development for Consumers; Aug. 1978; IEEE Transactions on Consumer Electronics, vol. CE-24, No. 3, pp. 468-472.

*Primary Examiner*—Alan Faber
*Assistant Examiner*—Alan K. Aldous
*Attorney, Agent, or Firm*—Wenderoth, Lind & Ponack

[57] ABSTRACT

An automatic tracking apparatus, by which a tracking condition of reproducing heads and a recorded track can be automatically adjusted. This apparatus has a rotary heads, an envelope detector, and a filter. A tracking error signal is generated by detecting the envelope of a video signal which does not contain chrominance signal components, the video signal being derived from the rotary heads. As a result, the tracking error signal includes only the luminance signal but does not include the signal from the next track. Therefore, the envelope signal is a good tracking error signal which is only responsive to the signal level of the objective track.

3 Claims, 5 Drawing Figures

ELIMINATING THE LOW-FREQUENCY CHROMINANCE SIGNAL FOR TRACKING IN A VIDEO TAPE RECORDER

BACKGROUND OF THE INVENTION

1. Field of the Invention

This invention relates to an automatic tracking apparatus which maintains good tracking between a rotary head scanning on tape and a recorded track on the tape by automatically detecting the tracking error. A video tape recorder (VTR, hereafter) used in this invention has rotary heads which are affixed to a piezoelectric element which displaces the heads in a lateral direction with respect to the recorded tracks.

2. Description of the Prior Art

Recently, the rotary heads in VTR are required to trace on recorded tracks with high-fidelity even upon slow motion or still picture reproduction. For satisfying this requirement, some VTRs have been developed recently, in which no tracking shifters are used and the rotary heads continuously scan the recorded tracks correctly from the starting point to the ending point of the recorded tracks. The operation principle of such VTRs is that the rotary heads are held via a piezoelectric element which displaces the heads in to the lateral direction with respect to the recorded tracks, and the rotary heads are moved so as to keep on-track by moving the piezoelectric element i.e. a (positionable element). In this case, control signals used to represent the direction and the amount of the deviation of the rotary heads must be provided from the recorded tracks. Such control signals are obtained by vibrating the rotary heads by a reference frequency $f_c$ of a sinusoidal wave signal (this vibration is called wobbling) and by synchronously detecting the thus generated envelope detection output.

However, in the conventional automatic tracking VTR which detects the envelope as described above, the cross talk of the chrominance signal reproduced from the different azimuth track reduces the S/N of the tracking error information, so that the operation of the automatic tracking is interferred with.

SUMMARY OF THE INVENTION

Therefore, it is an object of this invention to eliminate the above-described drawbacks, and to reduce the chrominance signal picked up from another azimuth track and to get the tracking error information by detecting the envelope of the RF signal which has a reduced chrominance signal.

This object is achieved according to this invention by providing in an automatic tracking system which is used in a video tape recorder having two rotary heads different in azimuth from each other and which moves the rotary heads to keep them on-track according to a tracking error signal obtained from an envelope of a video signal which is reproduced by the rotary heads and is composed of a chrominance signal converted to a low-frequency and a luminance signal, said envelope being detected by an envelope detecting means coupled to the rotary heads, the improvement comprising a filter means disposed between said heads and said envelope detecting means for eliminating the low-frequency converted chrominance signal so as to increase the S/N ratio of the tracking error signal with respect to a crosstalk signal, so that said envelope detected by said envelope detector substantially includes only an envelope of the luminance signal, whereby the S/N of the tracking error signal is improved.

In the azimuth recording VTR, this invention reduces the cross talk of the chrominance signal from another azimuth track, such that the tracking error signal is not interferred with by the cross talk component from the next track. In other words, the tracking error signal in this invention has a very high S/N and uses the envelope of only the luminance signal which is reproduced by the rotary heads. It is equivalent to the VTR having a guard band on the tape with a non-recorded space. In constructing an automatic tracking loop using this tracking error signal, automatic tracking can be realized with a very high accuracy. Accordingly, high quality reproduced pictures can be obtained.

The above and other objects and features of this invention will be apparent upon considering the following detailed descriptions taken in conjunction with the accompanying drawings, in which:

DETAILED DESCRIPTION OF THE INVENTION

At first, for simplifying the understanding of this invention, a conventional automatic tracking apparatus will be described in detail hereinafter with reference to FIGS. 1, 2 and 3.

Figure 1:
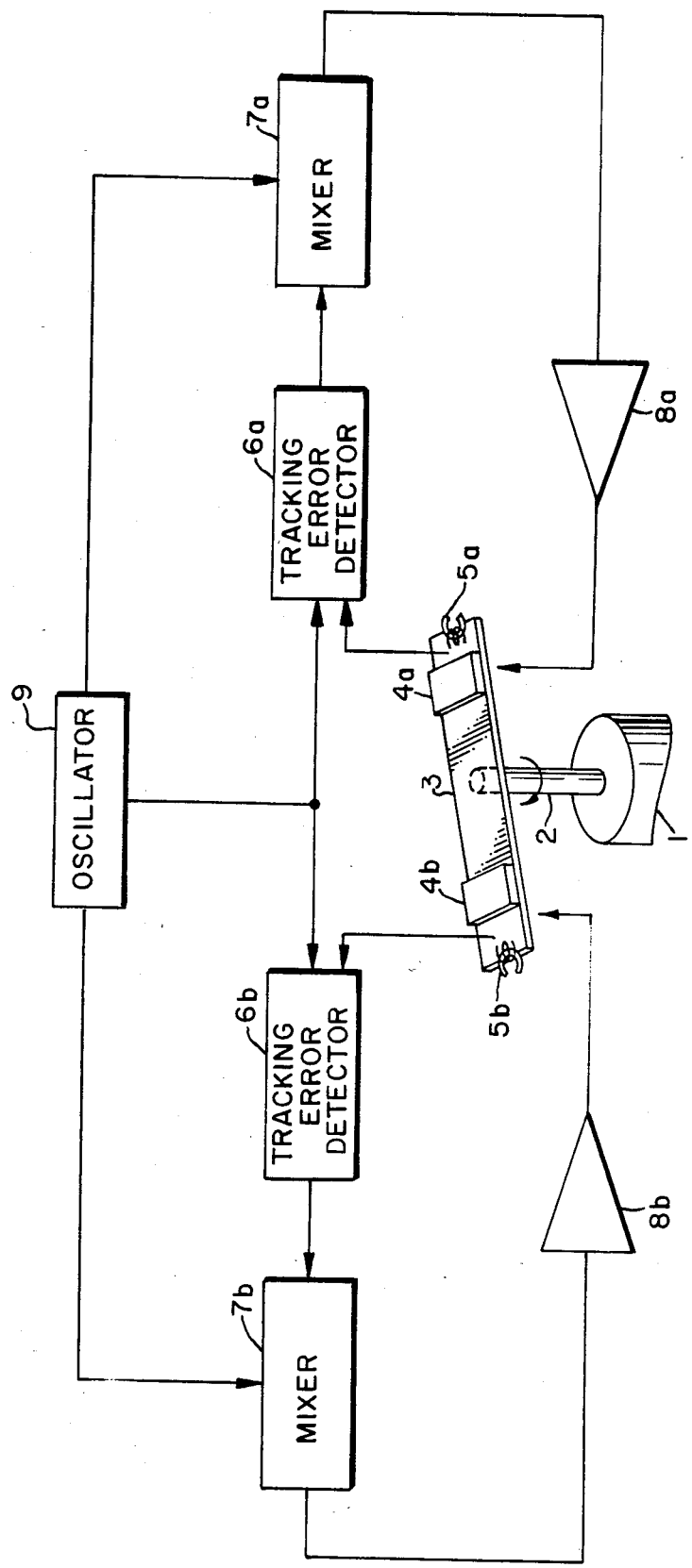
FIG. 1 is a typical block diagram of a conventional automatic tracking apparatus.

FIG. 1 is a typical block diagram of a conventional automatic tracking apparatus. FIG. 1 shows only the main blocks relating to the automatic tracking in the reproducing mode. The typical recorded tracks on a magnetic tape are shown in FIG. 2. Recording on this tape is achieved by two rotary heads which are different in azimuth from each other and are used to alternately recorded one field at a time. In FIG. 1, reference numeral 1 is a drum motor having a rotary shaft 2 which has a head bar 3 upon which are mounted piezoelectric elements 4a and 4b. The piezoelectric elements 4a and 4b have a structure which may be arranged such that two piezoelectric plates each having electrodes on opposite major surfaces thereof are bent to form a piezoelectric bimorph bender 4a or 4b. The polarization direction of each piezoelectric plate coincides with its thickness direction, and the piezoelectric bimorph bender deflects in the polarization direction in correspondence with the value of an applied d.c. voltage. Accordingly, rotary heads 5a and 5b, which are respectively mounted on the piezoelectric elements 4a and 4b, also deflect in the polarization direction. It is assumed here that the deflecting direction of the piezoelectric bimorph bender is the width direction of the tracks of the magnetic tape which the rotary heads 5a and 5b are contacting. This direction is perpendicular to the rotational direction of the drum motor 1 in the VTR of rotary head type of helical scanning direction.

On the other hand, on the magnetic tape, video signals are recorded as recorded tracks in such a manner that each field of the video signals is recorded on one magnetic track. The RF signals picked up by the rotary heads 5a and 5b are fed to a monitor television through normal reproducing signal processing circuits, and also fed back to the piezoelectric elements 4a and 4b through tracking error detectors 6a and 6b, mixers 7a and 7b which are coupled an oscillator 9 and driving amplifiers 8a and 8b. The method of automatic tracking which depends on this feedback loop is known as the wobbling method. The oscillator 9 generates a wobbling signal and vibrates two piezoelectric elements 4a and 4b by a small amplitude through the mixers 7a and 7b and the drive amplifiers 8a and 8b. The tracking error detectors 6a and 6b detect the envelope of the RF signals which are derived from the rotary heads 5a and 5b, and derive the tracking error signals which are responsive to the direction and amount of the tracking error by synchronously detecting the envelopes with the oscillation signal. The tracking error signals are fed back to the piezoelectric elements 4a and 4b and the tracking is achieved automatically. In FIG. 1, there are two automatic tracking loops, one for each rotary head 5a or 5b and the output signal of each rotary head is controlled so as to corresponds to its maximum level.

Figure 2:
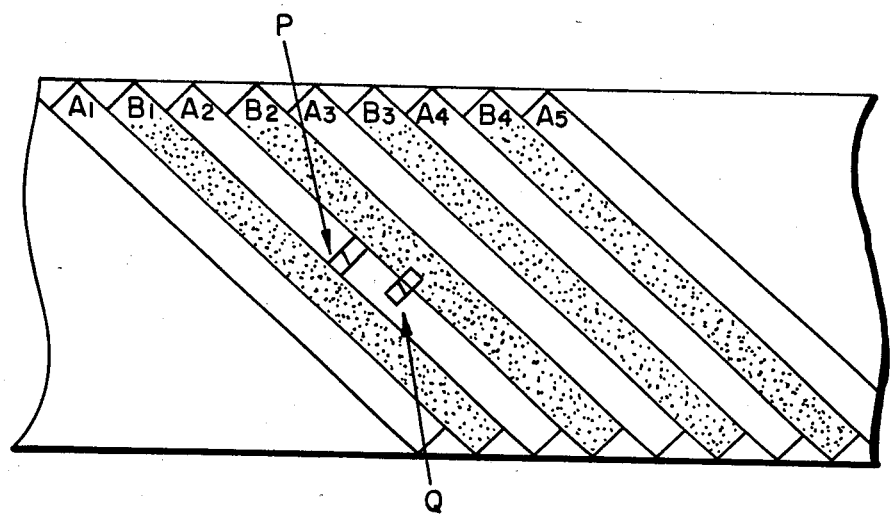
FIG. 2 shows a recorded track pattern diagram of the apparatus in FIG. 1.

In such an automatic tracking system, it a good idea to sharply reduce the envelope level of the RF signals derived from the rotary heads 5a and 5b if the rotary head is slightly off-track as seen the track pattern and head position Q in FIG. 2. The variation of the envelope used for the tracking error determines the Signal to Noise ratio (S/N) of the tracking error detector. Therefore, it is good form the variation of the envelope to be larger for the tracking error.

For another conventional automatic tracking method, a peak hold method is known in which the envelope of the RF signal is detected and the detecting output is sampled; the sampled output is then compared with the previous sample output in a regular sequence, and the rotary head is moved in the direction such that the detecting output is increasing. In this method, the envelope level is used to determine the tracking error. Therefore, the variation of the enveloped used for the tracking error must be sharp.

However, in an azimuth recording VTR which has no guard band, said recording tracks being recorded by two rotary heads which have a different azimuth, the RF signal reproduced from the adjacent tracks cause interference with respect to the RF signal reproduced from the objective tracks when a tracking error occurs. For example, when the rotary head having azimuth A is on track $A_2$ as shown by P in FIG. 2, the rotary head reproduces the signal recorded on $A_2$ track perfectly (100%). As shown by Q in FIG. 2, when the rotary head is at a position having a tracking error (i.e. off track), the RF signal level picked up from the same azimuth track $A_2$ is reduced, and it is possible to detect the reduction of the RF signal. However, in the case as shown by Q, the rotary head is also on the track $B_2$ which has a recorded azimuth B. Therefore, the RF signal is influenced by the signal caused by the next track $B_2$. The amount of this influence is different according to frequency.

Figure 3:
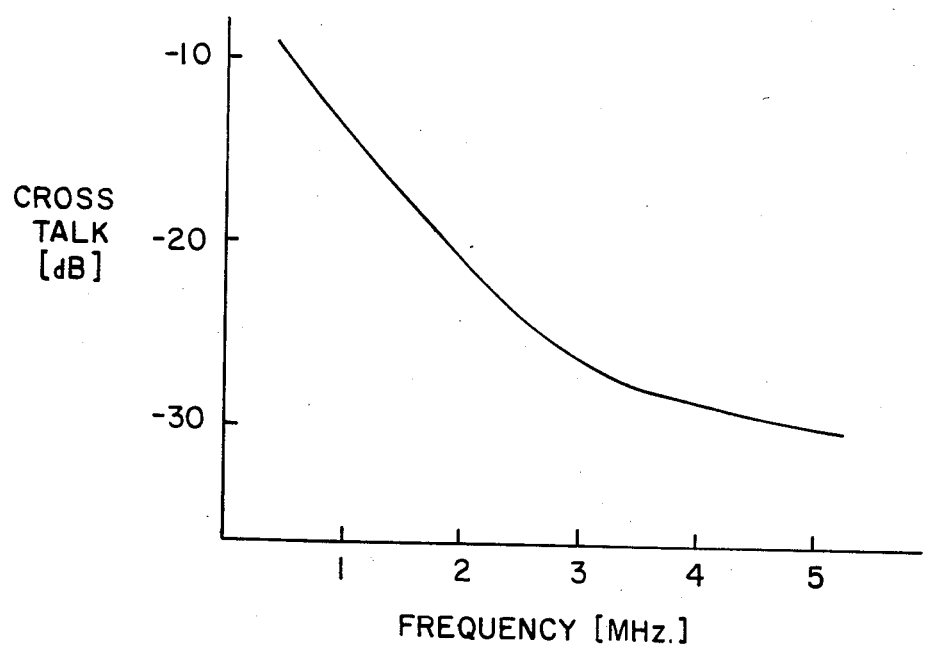
FIG. 3 is a frequency characteristics of the cross talk reproduced from the recorded track pattern in FIG. 2.

FIG. 3 shows the frequency characteristic of the cross talk reproduced from the next track which has a different azimuth ($\pm 7°$). From FIG. 3 it is found that the FM signal modulated by the luminance signal has a frequency band 1 MHz–5 MHz, so that the cross talk of the FM luminance signal is $-20$ to $-30$ db; and in the case of a chrominance signal converted to a low frequency signal (629 KHz), the cross talk is $-10$ dB. Accordingly, in the case where the rotary head is in the position Q shown in FIG. 2, the level of chrominance signal reproduced from track $B_2$ which has another azimuth is large compared with the FM luminance signal. Therefore, it is impossible to obtain accurate tracking error information.

Figure 4:
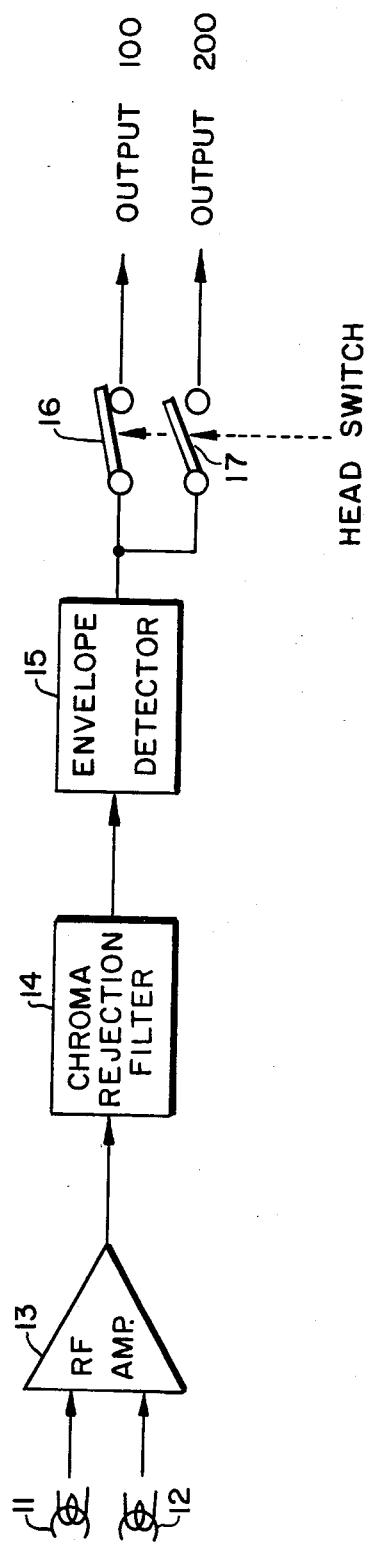
FIG. 4 is a schematic block diagram of a main part of an embodiment of this invention.
Figure 5:
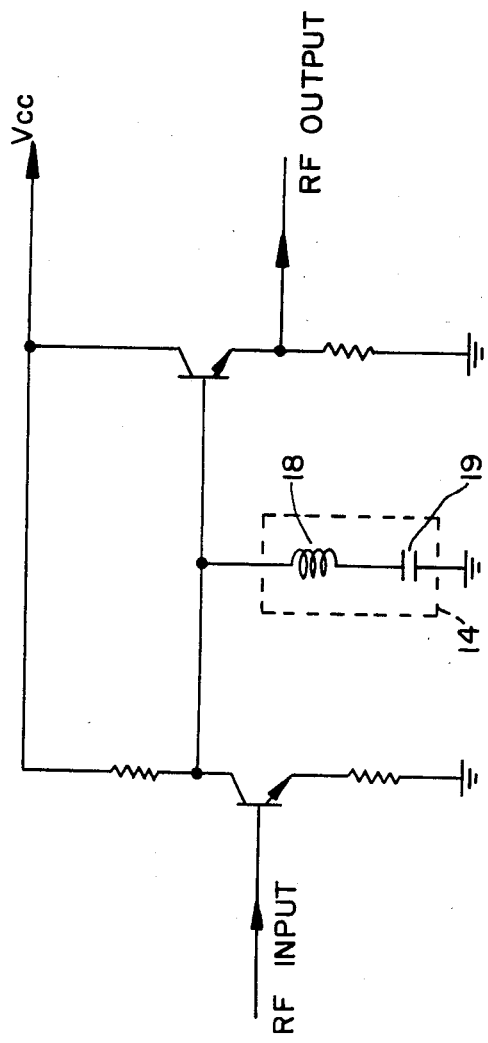
FIG. 5 is a circuit configuration diagram of a main part of an embodiment of this invention.

Now, this invention will be described hereinafter with reference to FIGS. 4 and 5 showing an embodiment of this invention.

FIG. 4 shows a block diagram of a tracking error detector used in an automatic track apparatus of the invention. In FIG. 4, the reproduced RF signals from rotary heads 11 and 12 are mixed and amplified by an RF amplifier 13. The RF signal is then applied to a chrominance rejecting filter 14 which reduces the chrominance signal having a low frequency and including the cross talk, and is converted by an envelope detector 15 to a signal corresponding to the envelope level which has no chrominance signal component. Two switch circuits 16 and 17 are alternately switched by a head switching signal, and the output signal of the envelope detector 15 is separated so as to form output signals 100 and 200 which correspond to the envelope level of the rotary heads 11 and 12. The output signals 100 and 200, which correspond to the envelope level of each rotary head, can be used directly as tracking error information in a peak hold tracking system. Also, they may be synchronously detected so as to form tracking error information.

The tracking error information generated as above does not contain the low frequency chrominance signal which has large cross talk components. As a result, the cross talk components from another track has only luminance components. However, the luminance components picked up from another azimuth track are reduced by the azimuth effect as described above. Accordingly, the tracking error information includes only the envelope signal of the objective track, so that an accurate automatic tracking operation can be achieved.

FIG. 5 shows an embodiment of the chrominance rejecting filter 14 shown in FIG. 4, and shows the connection with the previous stage and the following stage. A trap circuit 14' enclosed by the broken line is connected in the RF signal path, and it operates as the chrominance signal rejecting filter. For example, the trap circuit 14' is constructed by a coil 18 and a capacitor 19, and if their values are selected to be 150 $\mu$H and 430 pF, the chrominance signal converted to a low frequency (e.g. 629 kHz) signal is effectively reduced.

In addition, the embodiment above describes a VTR which has its chrominance signal is converted to a low frequency and has a frequency-modulated luminance signal.

Furthermore, the description of the embodiment of the above is only for the understanding of this invention. The principle of this invention can be modified and applied to the other types of VTRs for recording other formats.

What is claimed is:

1. In an automatic tracking system which is used in a video tape recorder having two rotary heads different in azimuth from each other and which moves the rotary heads to keep them on-track according to a tracking error signal obtained from an envelope of a video signal which is reproduced by the rotary heads and is composed of a chrominance signal converted to a low-frequency and a luminance signal, said envelope being detected by an envelope detecting means coupled to the rotary heads the improvement comprising a filter means disposed between said heads and said envelope detecting means for eliminating the low-frequency converted chrominance signal so as to increase the S/N ratio of the tracking error signal with respect to a cross-talk signal, so that said envelope detected by said envelope detector substantially includes only an envelope of the luminance signal, whereby the S/N of the tracking error signal is improved.

2. An automatic tracking system according to claim 1, wherein said filter means comprises a trap circuit composed of a coil and a capacitor which are connected in series with each other.

3. The automatic tracking system according to claim 1, wherein said filter means comprises a band elimination filter for eliminating frequency components in a band centered at about 629 kHz.

* * * * *